(12) United States Patent
Salmela

(10) Patent No.: US 6,398,444 B1
(45) Date of Patent: Jun. 4, 2002

(54) COUPLING FOR AIRPORT SURVEILLANCE ANTENNAS AND OTHER ROTATING STRUCTURES

(75) Inventor: Gordon O. Salmela, Framingham, MA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/443,523

(22) Filed: Nov. 19, 1999

(51) Int. Cl.[7] .................................................. F16F 1/18
(52) U.S. Cl. ........................ 403/53; 343/765; 267/160
(58) Field of Search ............................ 403/53, 59, 63, 403/120, 121, 166, 225, 289, 341, 220; 267/160; 343/765, 766

(56) References Cited

U.S. PATENT DOCUMENTS

| | | | | |
|---|---|---|---|---|
| 1,428,015 A | * | 9/1922 | Dienner | 403/220 |
| 2,735,731 A | * | 2/1956 | Freebairn, Jr. et al. | 267/160 X |
| 2,893,002 A | * | 6/1959 | Ross | 343/765 |
| 2,901,703 A | * | 8/1959 | Plunkett | 267/160 X |
| 3,138,988 A | * | 6/1964 | Herkt | 267/160 X |
| 3,545,286 A | * | 12/1970 | Stenstrom | 267/160 X |
| 3,596,865 A | * | 8/1971 | Camossi | 267/160 X |
| 3,624,656 A | * | 11/1971 | Kaschak | 343/766 X |
| 4,058,157 A | * | 11/1977 | Wiegard | 267/160 X |
| 4,311,303 A | * | 1/1982 | Nave | 267/160 |
| 4,733,839 A | * | 3/1988 | Gehris | 343/765 X |
| 4,933,681 A | * | 6/1990 | Estang | 343/765 |
| 5,139,242 A | * | 8/1992 | Yarr | 267/160 |
| 5,149,066 A | * | 9/1992 | Snaith et al. | 267/160 X |
| 5,529,277 A | * | 6/1996 | Ostazewski | 267/160 X |
| 5,639,173 A | * | 6/1997 | Eng | 403/59 |
| 6,023,247 A | * | 2/2000 | Rodeffer | 343/765 |

FOREIGN PATENT DOCUMENTS

| | | | | |
|---|---|---|---|---|
| DE | 2356859 | * | 1/1982 | 343/765 |
| JP | 574601 | * | 1/1982 | 343/765 |

* cited by examiner

*Primary Examiner*—Lynne H. Browne
*Assistant Examiner*—David E. Bochna
(74) *Attorney, Agent, or Firm*—Iandiorio & Teska

(57) ABSTRACT

A coupling including a ring member attached to a housing, the ring member having a through-hole and a ring axis; a body connected to the ring member by a pair of yielding but axially inextensible members preventing rotation of the body about the ring axis and preventing movement of the body in the direction of the axes of the inextensible members; and flexure plates which allow displacement of the ring member with respect to the housing in the direction of the axes of the inextensible members to thereby allow the body five degrees of freedom of movement with respect to the housing but not rotation about the ring axis.

49 Claims, 5 Drawing Sheets

COUPLING FOR AIRPORT SURVEILLANCE ANTENNAS AND OTHER ROTATING STRUCTURES

FIELD OF INVENTION

This invention relates to a coupling for airport surveillance antenna systems and other rotating structural systems and subsystems.

BACKGROUND OF INVENTION

Airport surveillance antennas include a rotating antenna mounted to a rotating part of an antenna pedestal. The antenna pedestal houses a rotary joint on its nominal center of rotation. The upper section of this rotary joint rotates with the antenna, and its lower section must not rotate with the antenna because it houses one or more encoders which determine the antenna pointing angle. If the lower section of the rotary joint rotates, the encoders rotate as well which results in antenna azimuth angle errors.

Because of inherent small offsets between the pedestal rotation axis and the rotary joint rotation axis, component coefficient of thermal expansion differences, and non-parallelism of the pedestal and rotary joint bearings, however, the lower section of the rotary joint cannot be clamped in or fixed rigidly with respect to the structure of the antenna pedestal.

Instead, the lower section of the rotary joint must be allowed to follow a small circular orbit inside the antenna pedestal to prevent wear or destruction of the pedestal and rotary joint bearings and/or wear or destruction of components and structure inside the antenna pedestal. Thus, the lower section of the rotary joint must be allowed to translate in three directions and tilt or rotate about two axes, but not rotate about the axis about which the antenna rotates or axes parallel thereto. Thus, five degrees of freedom of movement must be allowed for the lower section of the rotary joint, but not the sixth—rotation with the rotating antenna.

Previously, the lower section of the rotary joint was constrained against rotation with the antenna by a simple tangential link with ball joints on each end connecting the lower section of the rotary joint to a fixed point on the antenna pedestal. This tangential link allowed the necessary five degrees of freedom of movement of the lower section of the rotary joint but the tangential link also allowed an undesirable once per antenna revolution back and forth rotation of the lower section of the rotary joint. This periodic rotary motion moved the encoder bodies together with the lower section of the rotary joint resulting in a direct error in the azimuth angle of the antenna reported by the encoders.

Attempts to reduce this error were only minimally successful and even after such efforts the reported error was still roughly equal to the whole error budget in a Digital Airport Surveillance Radar (DASR).

Moreover, the asymmetry of this single tangential link imposed a side load on the rotary joint proportional to the rotary joint frictional torque. This side load plus other loads from the waveguide and electrical cable connections housed by the rotary joint deflect the rotary joint laterally adding to the rotary joint bearing loads and azimuth angle error.

SUMMARY OF THE INVENTION

It is therefore an object of this invention to provide a coupling for the rotary joint of an antenna system which reduces and virtually eliminates encoder errors.

It is a further object of this invention to provide such a coupling which is inexpensive, simple in design, and simple in construction.

It is a further object of this invention to provide such a coupling which prevents rotation of the lower section of the rotary joint with the antenna but yet which still allows the lower section of the rotary joint to translate and rotate as required in five other degrees of freedom of movement.

It is a further object of this invention to provide such a coupling which does not allow crosstalk which would result in rotation of the lower section of the rotary joint and such a coupling which does not contribute to side or bearing loads.

It is a further object of this invention to provide a coupling which can be used in connection with systems other than antenna pedestals: for example, telescope polarization drive subsystems.

This invention results from the realization that azimuth angle errors, side load torque, backlash, and crosstalk caused by rotation of the lower section of the rotary joint of an antenna pedestal can be reduced and yet the lower section of the rotary joint rendered displaceable in five other directions by the addition of a low profile, large through-hole, ring member surrounding the rotary joint which itself is translatable in only a first direction and by attaching the lower section of the rotary joint to the ring member in a way that relative movement is possible between the ring member and the rotary joint in all directions except in the first direction and rotation about the ring axis.

Two inexpensive steel cables attach the lower section of the rotary joint to the ring member preventing rotation of the lower section of the rotary joint about the ring axis to eliminate encoder errors, but the cables allow translation of the lower section of the rotary joint in the direction of the ring axis and in the direction of an axis orthogonal to the longitudinal axis of the cables to compensate for thermal mismatches and bearing offsets, respectively. The cables, however, do not elongate or contract by any appreciable amount along their longitudinal axes. Therefore, the ring member itself and thus the lower section of the rotary joint is allowed to move in the direction of the longitudinal axes of the cables by connecting the ring member to the antenna housing by steel flexure plates which only allow translation of the ring member in the direction of the longitudinal axes of the cables but restrict translation of the ring member in the direction of all other axes and also restrict tilting (i.e., rotation) of the ring member about all three axes.

This invention features a coupling comprising a ring member attached to a housing, the ring member having a through-hole and a ring axis; a body connected to the ring member by a pair of yielding but axially inextensible members preventing rotation of the body about the ring axis and preventing movement of the body in the direction of the axes of the inextensible members; and means for allowing displacement of the ring member with respect to the housing in the direction of the axes of the inextensible members to thereby allow the body five degrees of freedom of movement with respect to the housing but not rotation about the ring axis.

The ring member is typically round and has a diameter greatly exceeding its thickness for low profile applications. In the preferred embodiment, the inextensible members are cables. Each of the cables include on one end a clamping block fixed to the ring member. Each of the cables typically also include on an opposing end a reaction arm fixed to the body. The axes of the cables preferably extend in a first direction orthogonal to the ring axis and the reaction arms then preferably extend in a second direction orthogonal to the ring axis and orthogonal to the first direction.

The means for allowing displacement of the ring member with respect to the housing may include flexure members attached on one end to the ring member and attached on an opposing end to the housing. The flexure members may be thin flat steel plates diametrically opposed and attached to the ring member along an axis parallel to the axes of the inextensible members. The inextendible members are also diametrically opposed from each other about the ring member.

In the preferred embodiment, the housing is a fixed portion of an antenna mount, and the housing includes a cavity in which the ring is disposed. The body is the non-rotating portion of a rotary joint. At least one encoder is usually attached to the non-rotating portion of the rotary joint.

A coupling in accordance with this invention includes a ring member attachable to a housing, the ring member having a through-hole and a ring axis; a pair of yielding but axially inextensible members each connected on one end to the ring member and each connectable on an opposing end to a body to be constrained against rotation about the ring axis; and a pair of flexure members flexible in the direction of the axes of the inextensible members, each flexure member connected on one end to the ring member and connectable on an opposing end to the housing.

The ring member is typically round and has a diameter greatly exceeding its thickness for low profile applications. The axially inextensible members may be cables each of which include on one end a clamping block fixed to the ring members and, on an opposing end, a reaction arm.

The axes of the cables extend in a first direction orthogonal to the ring axis and the reaction arms extend in a second direction orthogonal to the ring axis and orthogonal to the first direction. The flexure members are usually diametrically opposed and attached to the ring member along an axis parallel to the axes of the inextensible members. The inextensible members are diametrically opposed on the ring member along an axis orthogonal to the axis of the flexure members.

This invention also features a coupling comprising a housing; a ring member disposed in the housing, the ring member having a through-hole; a first four bar linkage attaching the ring member to the housing; a body; and a second four bar linkage attaching the ring member to the body. Two bars of the second four bar linkage include flexible but axially inextensible members.

The first four bar linkage typically includes spaced flexure plates each connected on one end to the housing and each connected on an opposing end to the ring member. The flexible but axially inextensible members of the second four bar linkage typically include cables connected on one end to the ring member and connected on an opposing end to the body.

The cables are each connected to the body via a reaction arm. The housing may be a fixed portion of an antenna mount, the housing includes a cavity, and the ring member is disposed in the cavity. The body is then the non-rotating portion of a rotary joint and may include encoders attached to it.

BRIEF DESCRIPTION OF THE DRAWINGS

Other objects, features and advantages will occur to those skilled in the art from the following description of a preferred embodiment and the accompanying drawings, in which.

DISCLOSURE OF PREFERRED EMBODIMENT

Figure 1:
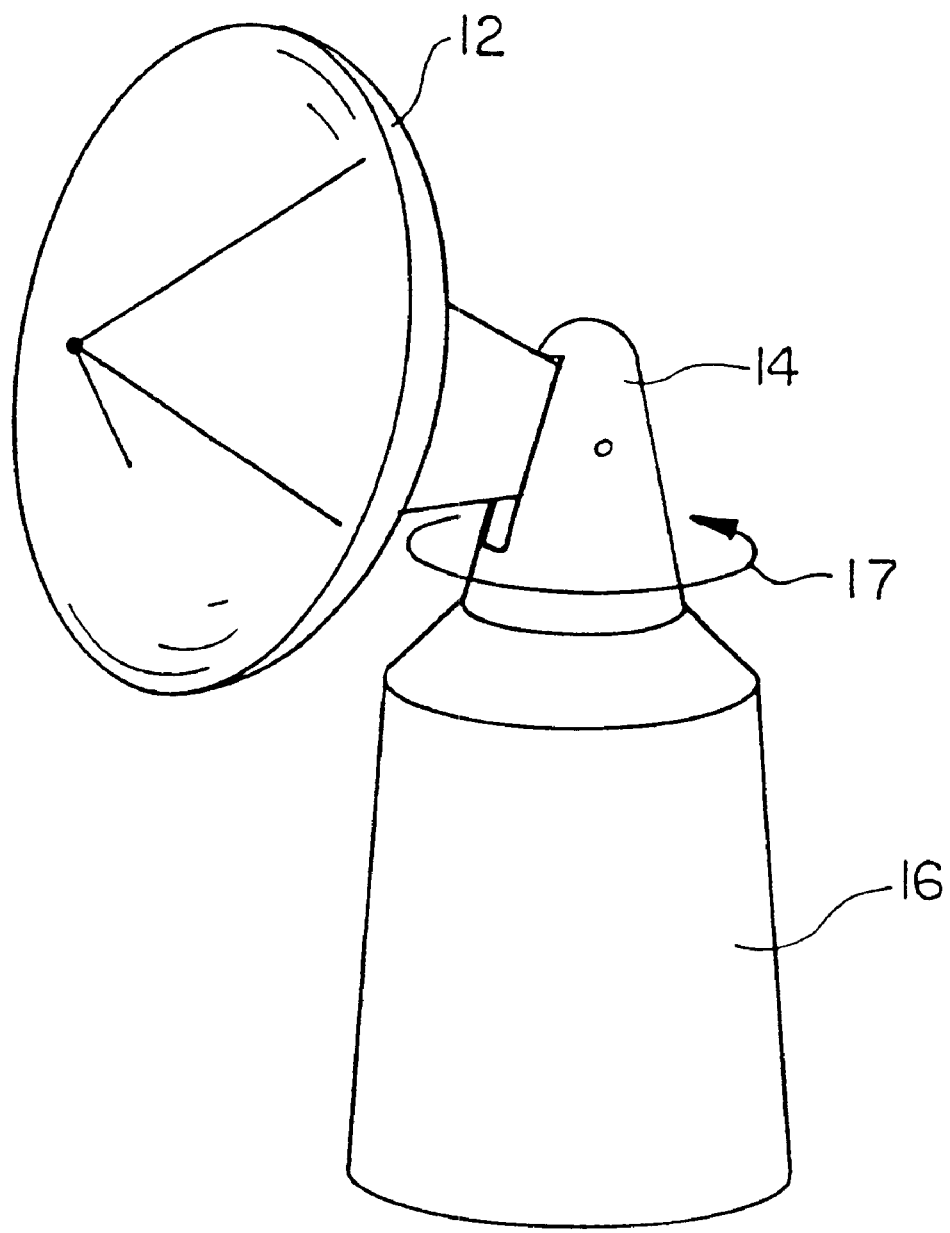
FIG. 1 is a schematic view of an airport surveillance antenna system.
Figure 2:
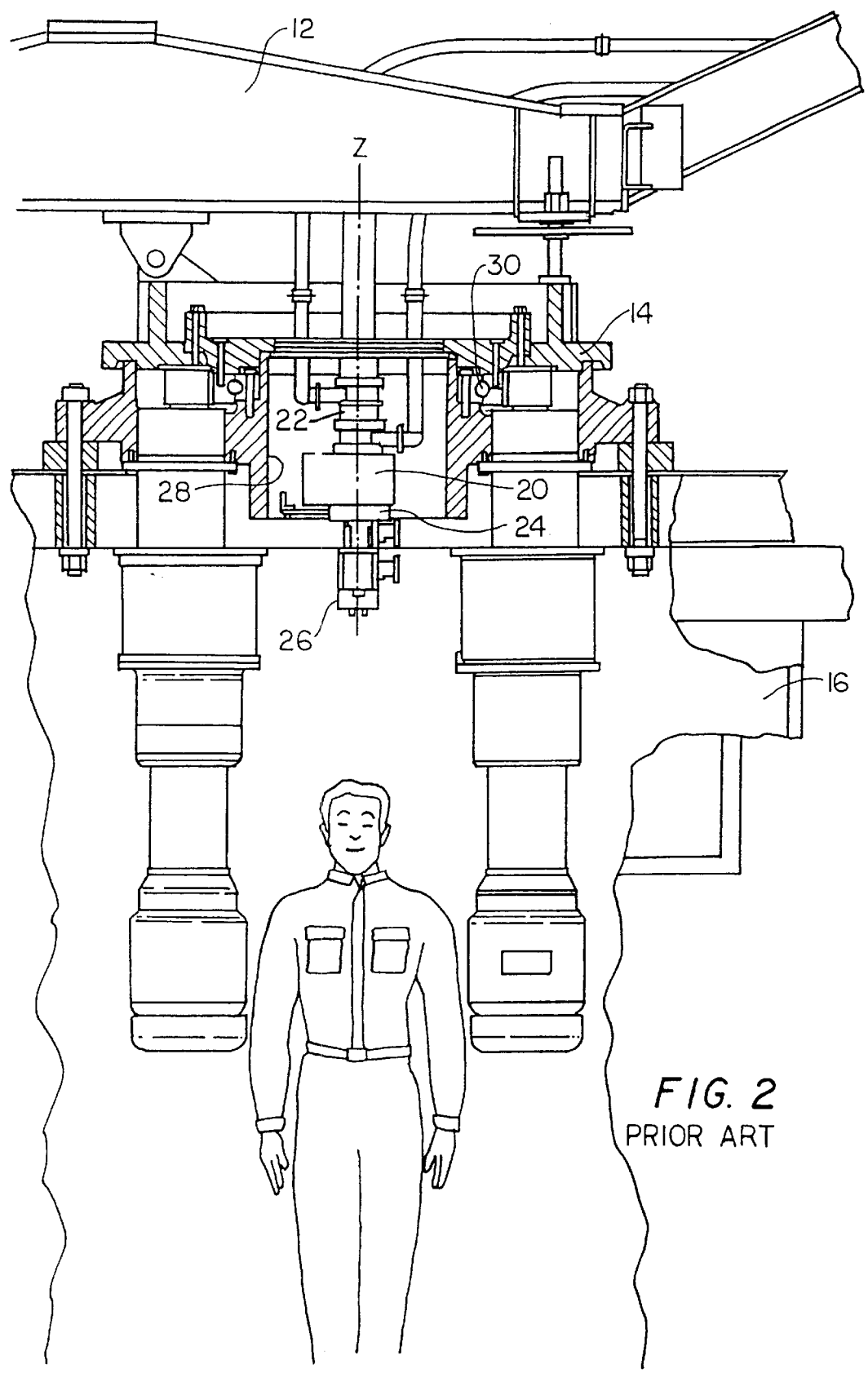
FIGS. 2–3 are schematic cross-sectional views showing the prior art method of constraining the lower section of the rotary joint of the antenna system shown in FIG. 1 against rotation with the rotating antenna.
Figure 3:
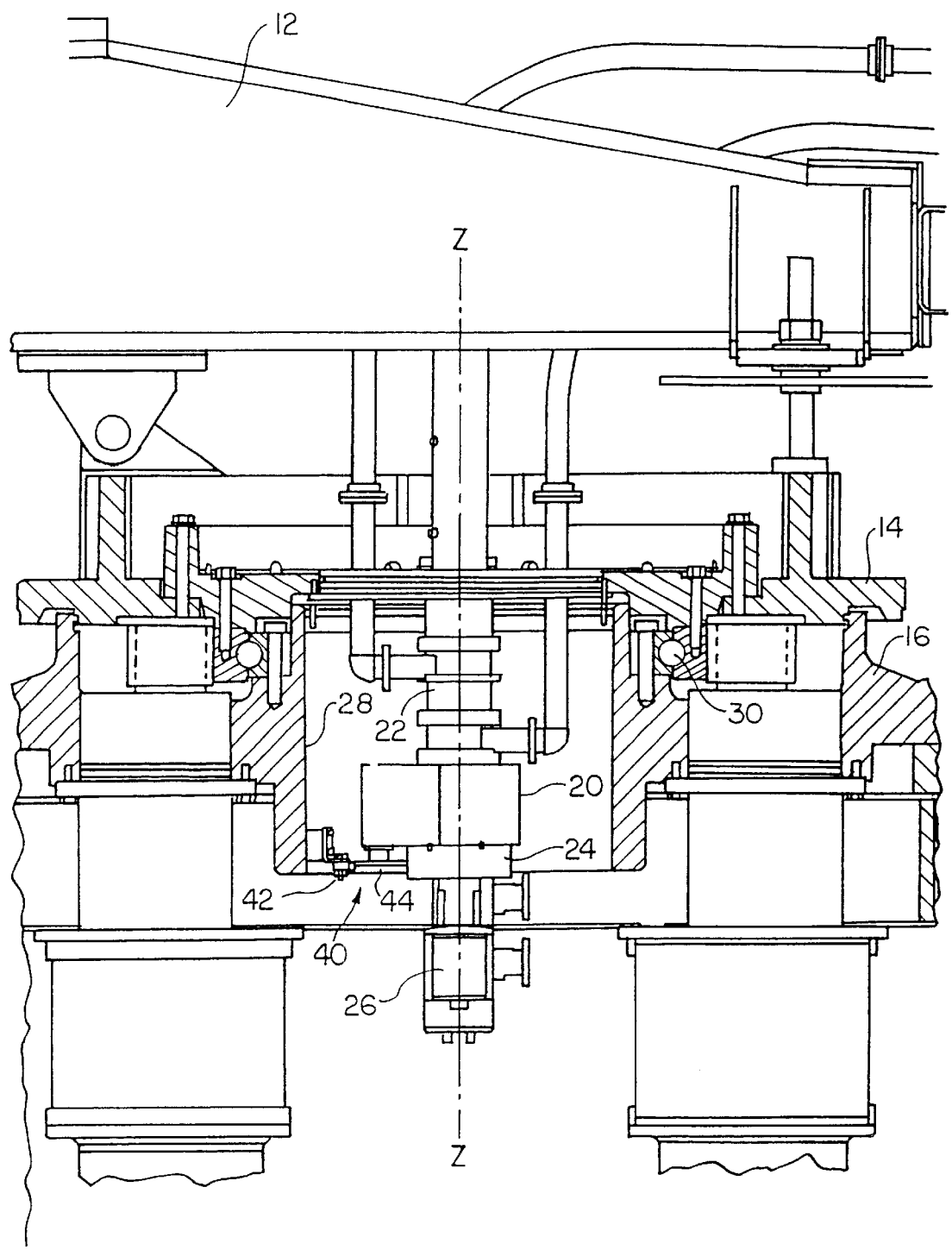

Airport surveillance antenna system 10, FIG. 1, includes antenna 12, rotating fixture 14, and antenna pedestal 16. Rotating fixture 14 rotates antenna 12 about the Z axis in the direction shown by arrow 17. Inside antenna pedestal 16, FIGS. 2–3, is rotary joint 20 which includes rotating upper section 22 and non-rotating lower section 24. Bearings (not shown) between rotating upper section 22 and lower non-rotating section 24 allow upper section 22 to rotate with rotating fixture 14. Azimuth angle encoders such as encoder 26 are mounted to lower section 24 and driven by gears internal to the rotary joint. The rotary joint also houses microwave paths and electrical connections and structure to pass one or more microwave signals (typically six channels) from the antenna pedestal or tower to rotating antenna 12.

To ensure the encoder angles match the pointing angle of the antenna at any given moment, lower rotating joint section 24 must not rotate about axis Z or any axis parallel thereto. However, lower rotating joint section 24 must not be fixed rigidly with respect to housing 28 of pedestal 16. Instead, it must be allowed to follow a small circular orbit as dictated by offsets of the axis of rotation of rotating fixture 14 and the axis of rotation internal to the rotary joint 20. Three additional relative motions must also occur between lower non-rotating section 24 and housing 28: vertical translation of lower rotating section 22 in the direction of the Z axis due to differences in component thermal expansion coefficients, and two orthogonal tilts due to non-parallelism of the pedestal bearing 30 between rotating fixture 14 and pedestal 16 and the bearings (not shown) between rotating upper section 22 and lower non-rotating section 24 of rotary joint 20.

Thus, five of the six possible degrees of freedom of movement must be allowed for lower non-rotating section 24 with respect to housing 28 with only rotation restrained about the Z axis and axes parallel thereto. Furthermore, the allowed five degrees of freedom of movement must not crosstalk into rotation of lower section 24 of rotary joint 20 about the Z axis.

In the prior art, rotation of lower section 24 of rotary joint 20 with respect to housing 28 was prevented by single tie or tangential link 40 between housing 28 and lower section 24. Link 40 includes ball joint 42 attaching rigid rod 44 on one end to housing 28 and another ball joint, not shown, attaching rigid rod 44 on the other end to lower rotary joint section 24. Link 40 allows the necessary five degrees of freedom of movement of lower section 24 but it also induces an undesirable corresponding once per revolution back and forth rotation of lower rotating joint section 24 about axis Z as lower rotary joint section 24 follows an orbital path in the horizontal plane within housing 28. The amplitude of this angular motion about the Z axis is:

arctan (rotating joint runout at the tie down point/tiedown point radius).    [1]

This undesirable periodic-once-per-antenna revolution back and forth rotation of lower rotary joint section 24 moves encoder 26 together with lower section 24 resulting in an error reported in the azimuth angle of antenna 12 by encoder 26. This error can be reduced by increasing the tiedown point radius or minimizing the runout, but it cannot be eliminated. The residual error, even after such efforts, is still roughly equal to the whole error "budget" allowed in the antenna system. Moreover, the asymmetry of the single tangential link between the lower section of the rotary joint and the antenna housing imposes a side load on the rotary joint proportional to the rotary joint frictional torque. This side load plus any other loads from waveguide or electrical cable connections deflects the rotary joint laterally adding to rotary joint bearing loads and azimuth angle error.

Figure 4:
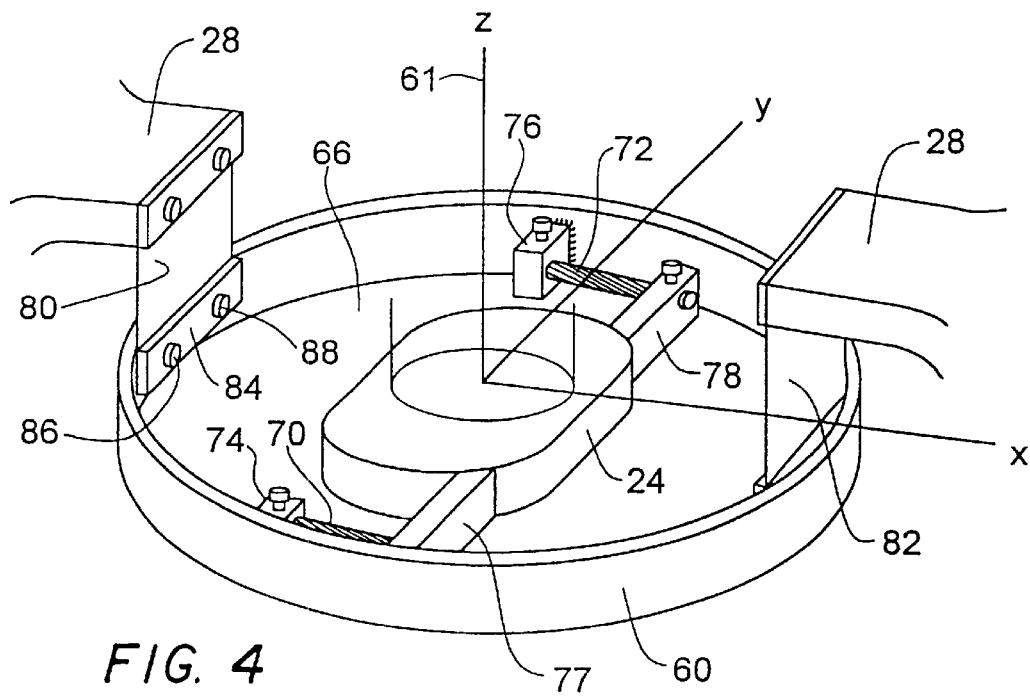
FIG. 4 is a top schematic view of the rotary joint coupling in accordance with the subject invention.
Figure 5:
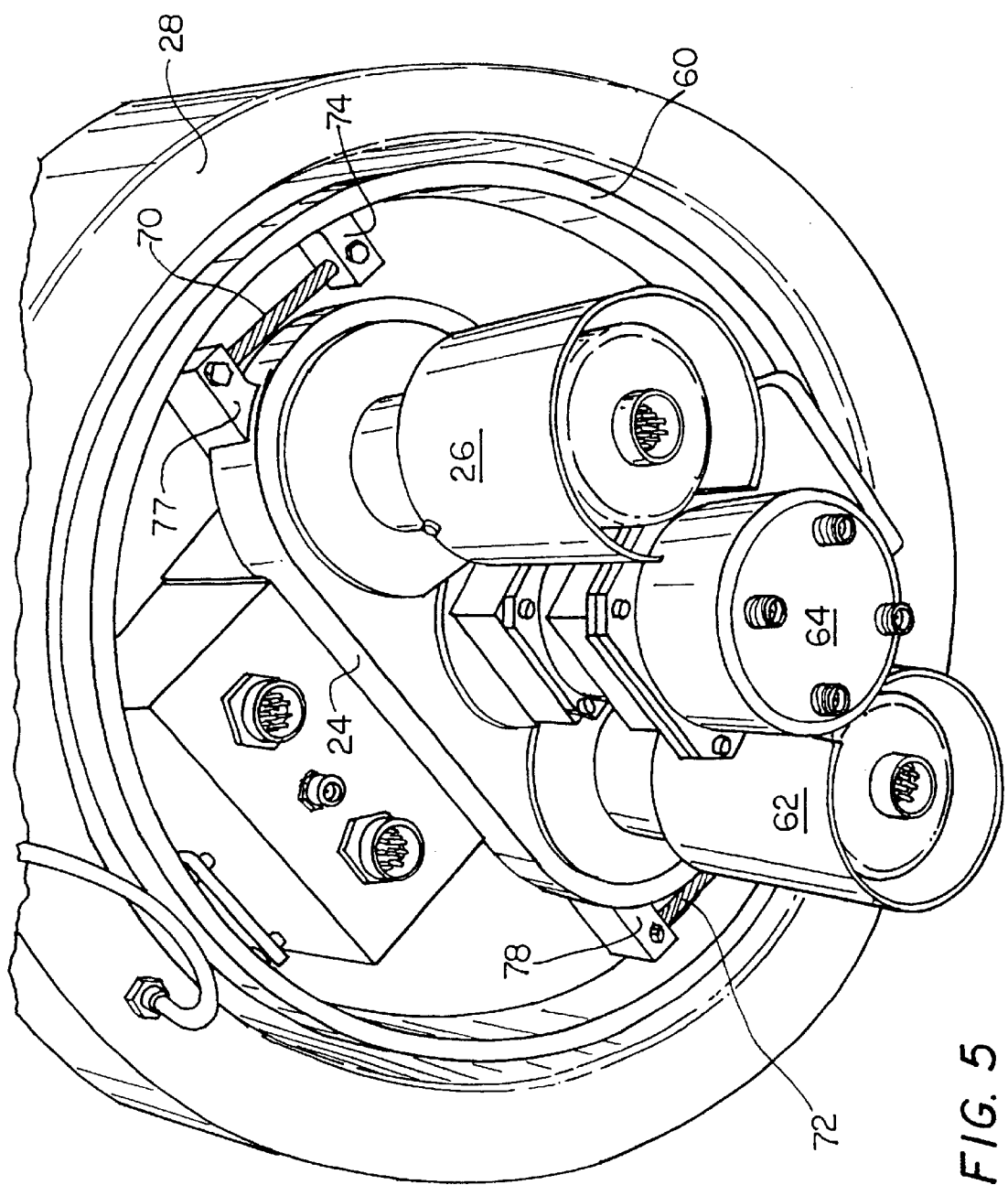
FIG. 5 is a bottom view of the coupling for the rotary joint in accordance with the subject invention.

In the subject invention, in contrast, rigid metal ring member 60, FIGS. 4–5 (e.g., 19½ inch OD, 18½ inch ID by 2 inch wide) is disposed between housing 28 and lower rotary joint section 24 which includes encoder 26 and backup encoder 62 as well as microwave channel housing 64 shown in FIG. 5. Thus, ring member 60 has a large through-hole 66 and is generally considered to have an inside diameter greatly exceeding its thickness (e.g., ½ inch thick versus 18½ inches in diameter). Ring member 60 also preferably has a low profile with a width greatly less than its inside diameter (e.g. 2 inches wide versus 18½ inches in diameter). The large through-hole accommodates the rotary joint and all the components attached to it. The low profile of ring member 60 allows it to fit within housing 28 of the antenna pedestal without interfering with any other components. Ring member 60, however, need not be round and instead could be square, hexagonal, or any other ring-like shape.

A body to be constrained against rotation about ring or Z axis 61, for example lower section 24 of a rotary joint, is connected to ring member 60 by a pair of parallel, usually diametrically opposed, axially inextensible, but otherwise laterally flexible members 70 and 72 (e.g. stranded steel cables) which in combination prevent both rotation of lower section 24 with respect to ring 60 about ring axis Z and also movement of lower section 24 in the direction of the longitudinal axes of inextensible members 70 and 72 (e.g., axes parallel to the X axis shown in FIG. 4). Rotation of lower section 24 about ring axis Z and movement (translation) in the direction of the X axis, however, is the only movement constrained by cables 70 and 72. 5/16" diameter, 3" long wire cables 70 and 72 readily flex or bow allowing lower section 24 to translate in the direction of the Y and Z axes and also flex or bow to allow lower section 24 to rotate or tilt slightly about the Y and X axes.

Preferably, cables 70 and 72 extend between clamping blocks 74 and 76, respectively, each of which are welded to ring member 60, and reaction arms 77 and 78 integral with lower rotary joint section 24. Swage buttons are disposed on the end of each cable and held in place in the orifices through the reaction arms and the clamping blocks via fasteners which bear upon the swage buttons.

Reaction arms 77 and 78 preferably extend in the direction of the Y axis but stop short of the interior surface of ring member 60. Thus, cables 70 and 72 extend in a first direction (in the direction of the X axis) which is orthogonal to the ring axis Z and reaction arms 77 and 78 extend in a second direction (in the direction of the Y axis) which is orthogonal to both ring axis Z and the X axis. Both cables 70 and 72 extend from the ring member 60 in the same direction. That is, 70 and 72 are disposed as a mirror image of each other, instead of both extending from the ring 60 in the same clockwise or counter clockwise direction. This arrangement provides the benefit of preventing the foreshortening of the cables 70 and 72 due to Z axis translation from resulting in an undesirable Z rotation.

In order to allow lower section 24 to translate in the direction of the X axis (movement which is constrained by the inextensible nature of cables 70 and 72), rigid ring member 60 is preferably connected to housing 28 by some means for allowing displacement of ring 60 with respect to housing 28 only in the direction of the axes of inextensible cables 70 and 72. In the preferred embodiment, such means include flexure members 80 and 82 (e.g., 0.20" thick, 2½ wide, 3" long stainless steel plates) shown in FIG. 4.

Steel plates 80 and 82 may bend and twist, but do not change shape in their own plane and thus ring member 60 is constrained from moving in the direction of the Y and Z axes, and constrained from rotating about the X, Y or Z axes relative to housing 28. The only motion of ring member 60 allowed with respect to housing 28 is translation in the direction of the X axis as steel plates 80 and 82 flex or bow in the direction of the X axis.

Flexure members 80 and 82 are each attached on one end to ring member 60 by plate 84 and fasteners 86 and 88 shown with respect to flexure member 80 in FIG. 4. Flexure members 80 and 82 are also each attached on their opposite end to housing 28 via a similar plate and fastener combination. Steel plates 80 and 82 are preferably diametrically opposed about ring member 60 along the X axis which is parallel to the longitudinal axes of cables 70 and 72. In this way, steel plates 80 and 82 flex and bow in and out in the direction of the X axis, allowing ring member 28 and hence body 24 to translate only in the direction of the X axis or to be displaced in the direction of the X axis relative to housing 28.

Thus, the combination of flexure plates 80 and 82 and cables 70 and 72 prevent rotation of body 24 about ring axis Z only thus preventing encoder errors. The combination of flexure plates 80 and 82 and cables 70 and 72, however, allow translation of body 24 in the direction of the X, Y and Z axes and rotation about the X and Y axes, thus allowing five degrees of freedom of movement. In this way, body 24 is allowed to follow a small circular orbital in housing 28 to compensate for any offset between the pedestal rotation axis and the rotating joint rotation axis, thermal expansion differentials, and non-parallelism of the pedestal and rotating joint bearings without inducing crosstalk and without inducing side loads. The following table lists the functions of the primary components of the coupling of the subject invention:

TABLE I

| Component | Movement constrained | Movement allowed |
| --- | --- | --- |
| Cables 70 and 72 | a) rotation of body 24 about axis Z and all axes parallel thereto to eliminate encoder errors.<br>b) translation of body 24 in the direction of the X-axis. | a) translation of body 24 in the direction of the Z axis to allow for differences in thermal coefficients of expansion<br>b) translation of body 24 in the direction of the Y axis to allow for axis of rotation offsets<br>c) rotation of body 24 about the X and Y axes to allow for non-parallelism of the bearings. |

TABLE I-continued

| Component | Movement constrained | Movement allowed |
|---|---|---|
| Flexure plates 80 and 82 | a) translation of ring member 60 in any direction other than in the direction of the X axis. b) rotation of ring member 60 about any axis | a) movement of ring member 60 and thus body 24 in the direction of the X-axis to allow for axis of rotation offsets |

The geometry of this novel arrangement is rectangular and symmetrical thus eliminating azimuth errors due to rotation in the X-Y plane. In addition, the two point attachment of body 24 to ring 60 eliminates side loads due to torque. The large center hole in ring 60 provides room to receive the rotating joint and provides for a large separation between flexures 80 and 82. This distance in turn provides high torsional rigidity (measured at 3 microradians/in.-lb. in the preferred embodiment) with low lateral spring rates. Moreover, the construction of the coupling of the subject invention does not require any precise components and is thus very economical.

Testing of the system shown in FIG. 5 demonstrated that the error contribution to the encoder was 0.001 degrees or less. Cable flexures 70 and 72 combine several functions without incurring any high cost precision or moving parts subject to wear or which would require lubrication. The coupling of the subject invention is inherently free from lost motion (backlash) and is thus applicable to other high-precision rotary motion applications such as directly driving encoders with a large through-hole and driving (or restraining from rotation) components concentric to an optical path such as a polarization drive of a telescope.

The means for allowing displacement of ring 60 with respect to housing 28 in only the direction of the X axis or in the direction of the longitudinal axes of cables 70 and 72, however, could be a structure other than flexure plates 80 and 82. For example, ring 60 could be configured to reside in a channel or race in housing 28 which allows only motion or movement of ring 60 in the direction of the X axis. Other such means are also available to those skilled in the art. Also, flexing or bending members other than cables 70 and 72 could be used including rigid shafts connected on each end by constant velocity joints or turnbuckles or U-joints.

In fact, translation in the direction of the ring axis Z may be undesirable or not required in some instances. Therefore, cables 70 and 72 could be constrained against bending in the direction of ring axis Z by structure added over the top and bottom of each cable. In other more complex embodiments, cables 70 and 72 could be replaced with actuators which expand and contract in unison in the direction of the X axis, eliminating the need for flexure plates 80 and 82. In the preferred embodiment of the subject invention, however, steel cables 70 and 72 and flexure plates 80 and 82 are used to reduce manufacturing costs and for simplicity.

In the embodiment where ring member 60 is used to support the lower section of a rotary joint in an antenna support housing, translation of the lower section of the rotary joint in the direction of the X and Y axes is very important because of the offset of the pedestal rotation axis relative to the rotary joint rotation axis. Orthogonal tilting about the X and Y axes is important due to non-parallelism of the pedestal and the rotary joint bearings. Translation in the direction of the Z axis is important to some extent because of different coefficients of thermal expansion or temperature differences of the component materials inside the antenna housing. In other systems, however, the polarization drive of a telescope, for example, may not require translation in the direction of the Z axis and/or tilting about the X and Y axes.

Figure 6:
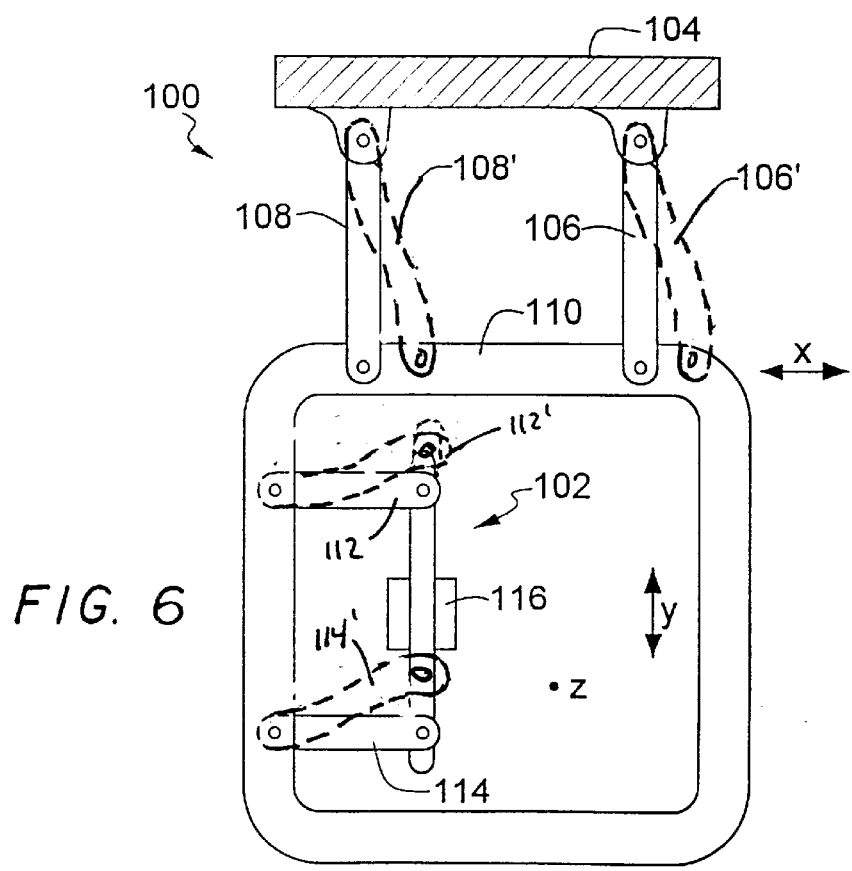
FIG. 6 is a schematic view showing the principle of operation of the coupling of the subject invention.

The mechanics of the preferred embodiment can be understood by reference to FIG. 6 which shows two four bar linkages 100 and 102. Four bar linkage 100 includes bar 104, bar 106, bar 108, and bar 110. Bar 104 is housing 28 in FIGS. 4–5. Bars 106 and 108 are flexure plates 80 and 82. Bar 110 is ring 60.

Bar 110 (ring 60) also forms a part of second four bar linkage 102 which itself includes bars 112, 114, and 116. Bars 112 and 114 are cables 70 and 72 in FIGS. 4–5. Bar 116 is lower section 24 of the rotary joint. Four bar linkage 100 allows movement of bar 110 (ring 60) in only the direction of the X axis as bars 108 and 106 (flexure plates 80 and 82) flex into the position shown at 108' and 106'. Four bar linkage 102 allows translation of bar 116 (lower section 24 of the rotary joint) in the direction of the Y axis as bars 112 and 114 (cables 70 and 72) bow and flex the position shown in phantom at 112' and 114'. Because bars 112 and 114 are flexible, four bar linkage 102 also allows translation of bar 116 in the direction of the Z axis as the cables (bars 112 and 114) flex out of the plane of the drawing shown in FIG. 6. In addition, because of the flexible nature of the cables (bars 112 and 114), slight tilting of bar 116 is allowed about the X and Y axes. Since bars 112 and 114 are inextensible, however, rotation about the Z axis and axes parallel thereto is prohibited.

Although specific features of the invention are shown in some drawings and not in others, this is for convenience only as each feature may be combined with any or all of the other features in accordance with the invention.

Other embodiments will occur to those skilled in the art and are within the following claims:

What is claimed is:

1. A coupling comprising:
    a ring member attached to a housing, the ring member having a through-hole and a ring axis;
    a body connected to the ring member by a pair of yielding but axially inextensible members preventing rotation of the body about the ring axis and preventing movement of the body in the direction of the axes of the inextensible members; and
    means for allowing displacement of the ring member with respect to the housing in the direction of the axes of the inextensible members to thereby allow the body five degrees of freedom of movement with respect to the housing but not rotation about the ring axis.

2. The coupling of claim 1 in which the ring member is round and has a diameter greatly exceeding its thickness for low profile applications.

3. The coupling of claim 1 in which the inextensible members are cables.

4. The coupling of claim 3 in which each of the cables include on one end a clamping block fixed to the ring member.

5. The coupling of claim 4 in which each of the cables include on an opposing end a reaction arm fixed to the body.

6. The coupling of claim 5 in which the axes of the cables extend in a first direction orthogonal to the ring axis and the reaction arms extend in a second direction orthogonal to the ring axis and orthogonal to the first direction.

7. The coupling of claim 1 in which the means for allowing displacement of the ring member with respect to the housing includes flexure members attached on one end to the ring member and attached on an opposing end to the housing.

8. The coupling of claim 7 in which the flexure members are thin flat steel plates.

9. The coupling of claim 7 in which the flexure members are diametrically opposed and attached to the ring member along an axis parallel to the axes of the inextensible members.

10. The coupling of claim 1 in which the inextensible members are diametrically opposed.

11. The coupling of claim 1 in which the housing is a fixed portion of an antenna mount, the housing including a cavity, the ring disposed in the cavity.

12. The coupling of claim 11 in which the body is a non-rotating portion of a rotary joint.

13. The coupling of claim 12 further including at least one encoder attached to the non-rotating portion of the rotary joint.

14. A coupling comprising:
a ring member attachable to a housing, the ring member having a through-hole and a ring axis;
a pair of yielding but axially inextensible members each connected to the ring member and configured to constrain a body against rotation about the ring axis; and
a pair of flexure members flexible in the direction of the axes of the inextensible members, each flexure member interconnecting the ring member and the housing.

15. The coupling of claim 14 in which the ring member is round and has a diameter greatly exceeding its thickness for low profile applications.

16. The coupling of claim 14 in which the axially inextensible members are cables.

17. The coupling of claim 16 in which each of the cables include on one end a clamping block fixed to the ring members.

18. The coupling of claim 17 in which each of the cables include on an opposing end a reaction arm.

19. The coupling of claim 18 in which the axes of the cables extend in a first direction orthogonal to the ring axis and the reaction arms extend in a second direction orthogonal to the ring axis and orthogonal to the first direction.

20. The coupling of claim 14 in which the flexure members are diametrically opposed and attached to the ring member along an axis parallel to the axes of the inextensible members.

21. The coupling of claim 20 in which the inextensible members are diametrically opposed on the ring member along an axis orthogonal to the axis of the flexure members.

22. A coupling comprising:
a housing;
a ring member disposed in the housing, the ring member having a through-hole;
a first four bar linkage attaching the ring member to the housing;
a body; and
a second four bar linkage attaching the ring member to the body, two bars of said second four bar linkage including flexible but axially inextensible members.

23. The coupling of claim 22 in which the first four bar linkage includes spaced flexure plates each connected on one end to the housing and each connected on an opposing end to the ring member.

24. The coupling of claim 23 in which the spaced flexure plates are diametrically opposed about the ring member.

25. The coupling of claim 22 in which the flexible but axially inextensible members of the said second four bar linkage include cables connected on one end to the ring member and connected on an opposing end to the body.

26. The coupling of claim 25 in which the cables are each connected to the body via a reaction arm.

27. The coupling of claim 22 in which the housing is a fixed portion of an antenna mount, the housing including a cavity, the ring member disposed in the cavity.

28. The coupling of claim 27 in which the body is a non-rotating portion of a rotary joint.

29. The coupling of claim 28 further including at least one encoder attached to the non-rotating portion of the rotary joint.

30. A coupling comprising:
a ring member attached to a housing, the ring member having a through-hole and a ring axis;
a body connected to the ring member by a pair of yielding but axially inextensible members preventing rotation of a body about the ring axis and preventing movement of the body in the direction of the axes of the inextensible members;
means for allowing displacement of the ring member with respect to the housing in the direction of axes of the inextensible members to thereby allow the body five degrees of freedom of movement with respect to the housing but not rotation about the ring axis;
wherein the extensible members are cable including on one end a clamping block fixed to the ring member and on an opposing end a reaction arm fixed to the body; and
wherein the axes of the cables extend in a first direction orthogonal to the ring axis and the reaction arms extend in the second direction orthogonal to the ring axis and orthogonal to the first direction.

31. A coupling comprising:
a ring member attached to a housing, the ring member having a through-hole and a ring axis;
wherein the housing is a fixed portion of an antenna mount, the housing including a cavity, and the ring disposed in the cavity;
a body connected to the ring member by a pair of yielding but axially inextensible members preventing rotation of the body about the ring axis and preventing movement of the body in the direction of the axes of the inextensible members; and
means for allowing displacement of the ring member with respect to the housing in the direction of the axes of the inextensible members to thereby allow a body five degrees of freedom of movement with respect to the housing but not rotation about the ring axis.

32. The coupling of claim 31, in which the body is a non-rotating portion of the rotary joint.

33. The coupling of claim 32 further including at least one encoder attached to the non-rotating portion of the rotary joint.

34. A coupling comprising:
a ring member attachable to a housing, the ring member having a through-hole and a ring axis;
a pair of yielding but axially inextensible members each connected to the ring member for constructing a body against rotation about the ring axis;
a pair of flexure members flexible in the direction of axis of the inextensible members, each flexure member connected to the ring member;
wherein the axially inextensible members are cables including on one end a clamping block fixed to the ring members and on an opposing end a reaction arm; and
wherein the axes of the cables extend in a first direction orthogonal to the ring axis and the reaction arms extend in a second direction orthogonal to the ring axis and orthogonal to the first direction.

35. A coupling comprising;

a housing;

a ring member disposed in the housing, the ring member having a through-hole;

a first four bar linkage attaching the ring member to the housing;

a body; and a second four bar linkage attaching the ring member to the body, two bars of the second four bar linkage including flexible but axially inextensible members;

wherein the housing is a fixed portion of an antenna mount, the housing including a cavity, and the ring member disposed in the cavity.

36. The coupling of claim 35 in which the body is a non-rotating portion of a rotary joint.

37. The coupling of claim 35 further including at least one encoder attached to the non-rotating portion of the rotary joint.

38. A coupling comprising:

a ring member attachable to a housing, the ring member having a through-hole and a ring axis;

a pair of yielding but axially inextensible members each connected to the ring member for constraining a body against rotation about the ring axis, wherein the axially inextensible members are cables, and in which each of the cables include on one end a clamping block fixed to the ring members; and a pair of flexure members flexible in the direction of the axes of the inextensible members, each flexure member connected to the ring member.

39. The coupling of claims 38 in which each of the cables include on an opposing end a reaction arm.

40. The coupling of claim 39 in which the axes of the cables extend in a first direction orthogonal to the ring axis and the reaction arms extend in a second direction orthogonal to the ring axis and orthogonal to the first direction.

41. The coupling of claim 38 in which the flexure members are diametrically opposed and attached to the ring member along an axis parallel to the axes of the inextensible members.

42. The coupling of claim 41 in which the inextensible members are diametrically opposed on the ring member along an axis orthogonal to the axis of the flexure members.

43. A coupling comprising:

a housing;

a ring member disposed in the housing, the ring member having a through-hole;

a first four bar linkage attaching the ring member to the housing, in which the first four bar linkage includes spaced flexure plates each connected on one end to the housing and each connected on an opposing end to the ring member;

a body; and a second four bar linkage attaching the ring member to the body, two bars of said second four bar linkage including flexible but axially inextensible members.

44. The coupling of claim 43 in which the spaced flexure plates are diametrically opposed about the ring member.

45. The coupling of claim 43 in which the flexible but axially inextensible members of the said second four bar linkage include cables connected on one end to the ring member and connected on an opposing end to the body.

46. The coupling of claim 45 in which the cables are each connected to the body via a reaction arm.

47. The coupling of claim 43 in which the housing is a fixed portion of an antenna mount, the housing including a cavity, the ring member disposed in the cavity.

48. The coupling of claim 47 in which the body is a non-rotating portion of a rotary joint.

49. The coupling of claim 47 further including at least one encoder attached to the non-rotating portion of the rotary joint.

* * * * *